US010887501B2

(12) United States Patent
Takayama et al.

(10) Patent No.: US 10,887,501 B2
(45) Date of Patent: Jan. 5, 2021

(54) INSPECTION DEVICE

(71) Applicant: AISIN SEIKI KABUSHIKI KAISHA, Kariya (JP)

(72) Inventors: Munehiro Takayama, Kariya (JP); Masataka Toda, Kariya (JP); Yukio Ichikawa, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 16/725,073

(22) Filed: Dec. 23, 2019

(65) Prior Publication Data
US 2020/0204714 A1 Jun. 25, 2020

(30) Foreign Application Priority Data
Dec. 25, 2018 (JP) .................................. 2018-240895

(51) Int. Cl.
*G06T 7/00* (2017.01)
*H04N 5/225* (2006.01)

(52) U.S. Cl.
CPC ......... *H04N 5/2256* (2013.01); *G06T 7/0004* (2013.01); *G06T 2207/10024* (2013.01); *G06T 2207/10152* (2013.01)

(58) Field of Classification Search
CPC . G06T 2207/10016; G06T 2207/10024; G06T 2207/10152; G06T 7/0004; H04N 5/2256
See application file for complete search history.

(56) References Cited

U.S. PATENT DOCUMENTS 5,309,222 A * 5/1994 Kamei ............... G01B 11/2527
356/613
2017/0309013 A1* 10/2017 Takayama ............... G06T 7/001

FOREIGN PATENT DOCUMENTS

| JP | 2011-226814 A | 11/2011 |
| JP | 2017-194380 A | 10/2017 |
| JP | 2019-45346 A | 3/2019 |

* cited by examiner

Primary Examiner — Howard D Brown, Jr.
(74) Attorney, Agent, or Firm — Oblon, McClelland, Maier & Neustadt, L.L.P.

(57) ABSTRACT

An inspection device includes: an inspection pattern creating unit that creates an inspection pattern in which first regions each colored with a color different from each other and second regions each colored with a mixed color obtained by mixing at least two of colors with which the first regions are colored are alternately arranged; an irradiation unit that irradiates a surface of an inspection target with the inspection pattern while sliding the inspection pattern by a movement amount; a captured image acquisition unit that acquires a captured image obtained by imaging the surface of the inspection target irradiated with the inspection pattern; and a determination unit that generates color component images obtained by separating the acquired captured image for each of color components of the colors and determines whether or not there is a defect in the surface of the inspection target based on the color component images.

4 Claims, 7 Drawing Sheets

FIG.9
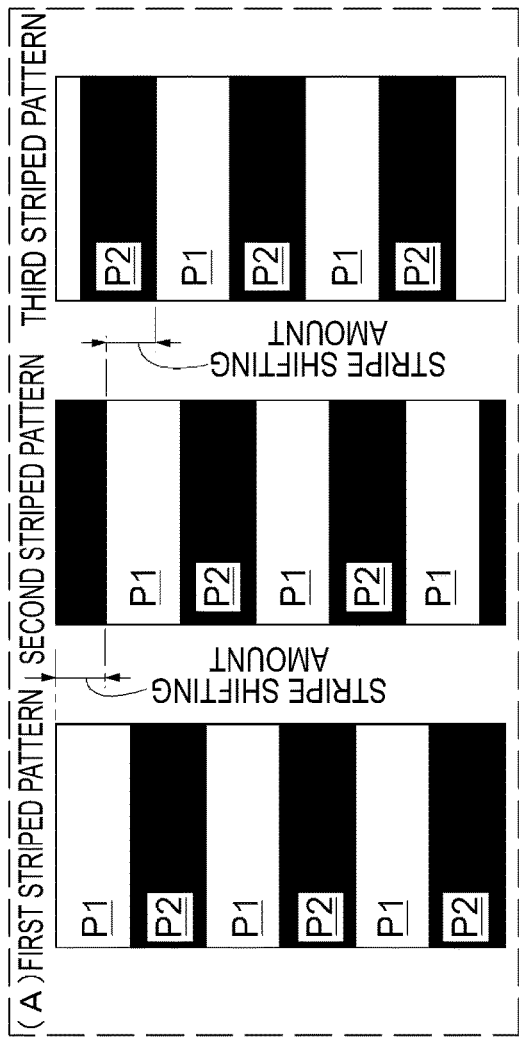
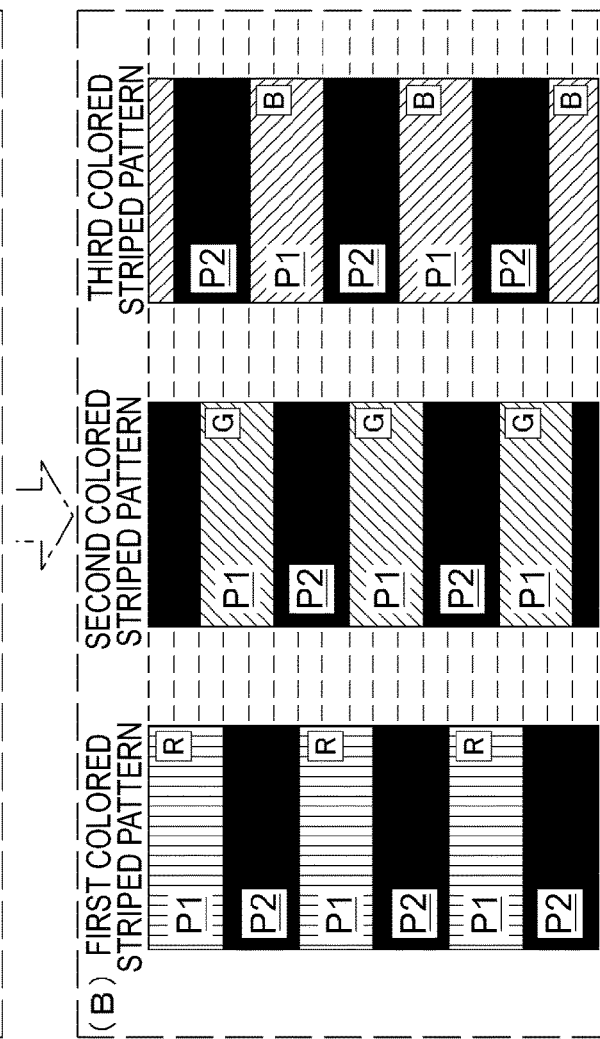
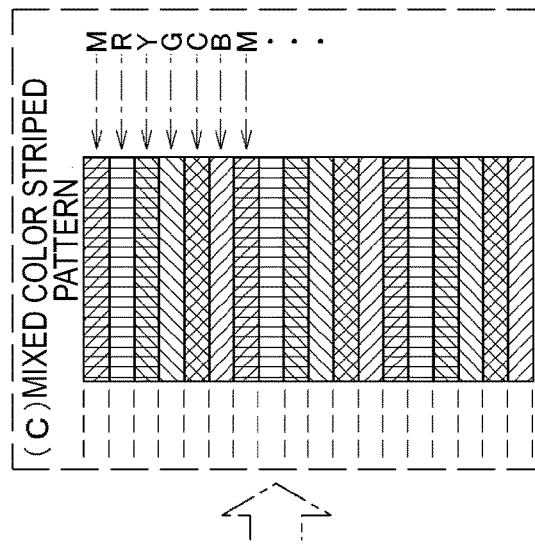

INSPECTION DEVICE

CROSS REFERENCE TO RELATED APPLICATIONS

This application is based on and claims priority under 35 U.S.C. § 119 to Japanese Patent Application 2018-240895, filed on Dec. 25, 2018, the entire contents of which are incorporated herein by reference.

TECHNICAL FIELD

This disclosure relates to an inspection device that inspects whether or not there is a defect in a surface of an inspection target.

BACKGROUND DISCUSSION

For example, an uneven portion unexpected in design may be formed on a surface of a product during a product manufacturing process. Such an uneven portion becomes a defect in quality of the product. In addition, there is a case where painting is performed on a surface of a product. However, during a painting process, painting material may remain in the form of grains on the surface of the product, the painting may be performed with dust being present on the surface, and the painting may be performed unevenly in terms of thickness such that the quality of the painting becomes poor. In this case as well, an uneven portion unexpected in design is formed on the surface of the product and the uneven portion becomes a defect in quality of the product. Therefore, in the related art, a technique of inspecting whether or not there is such a defect has been used (for example, JP 2011-226814A).

A surface defect inspection device that inspects a defect in a surface of a painted inspection target is described in JP 2011-226814A. The surface defect inspection device is provided with a lighting unit that irradiates a surface of an inspection target with a striped pattern and an imaging unit that images the inspection target irradiated with the striped pattern and the surface defect inspection device inspects whether or not there is a defect in the surface of the inspection target based on an image captured by the imaging unit. Since a defect (uneven portion) in the surface of the inspection target changes the cycle, the shape, or the like of the striped pattern imaged by the imaging unit, whether or not there is a defect in the surface of the inspection target is inspected based on the amount of the change. Here, not only a surface defect but also the shape of the inspection target changes the striped pattern imaged. Therefore, in a case where a surface of an inspection target is composed of surfaces of various curvatures, it is necessary to divide the surface of the inspection target into small regions of the respective curvatures, to project a striped pattern suitable for each small region, and to perform inspection a number of times corresponding to the number of divisions. Therefore, in the case of the surface defect inspection device in JP 2011-226814A, in order to inspect a surface of an inspection target having various curvatures by performing inspection one time, striped patterns obtained by combining blue, green, and red, which are different in light-dark cycle, are projected in accordance with curved surfaces respectively, the striped patterns reflected by the inspection target are imaged by the imaging unit, and an image obtained by imaging the striped patterns is separated into components of blue, green, and red such that images of the striped patterns with the light-dark cycles corresponding to the curvatures of the curved surfaces are obtained. Accordingly, it is possible to inspect the surface of the inspection target having various curvatures by performing an imaging operation one time.

In the case of a technique described in JP 2011-226814A, at the time of inspection of the surface of the inspection target, the striped pattern are projected and imaged while being slid by a shifting amount set in advance, corresponding to one cycle of each striped pattern. Therefore, a time taken for performing inspection one time is "stripe width"× 2/"shifting amount"×"projecting and imaging time". Here, in the viewpoint of the productivity of the product, the shorter a time take for inspection is, the more favorable the productivity of the product is. Even in the technique described in JP 2011-226814A, there is room for improvement in productivity with reduction in inspection time.

Thus, a need exists for an inspection device which is not susceptible to the drawback mentioned above.

SUMMARY

A feature of an inspection device according to an aspect of this disclosure resides in that the inspection device includes an inspection pattern creating unit that creates an inspection pattern which is provided with a plurality of first regions each colored with a color different from each other and a plurality of second regions each colored with a mixed color obtained by mixing at least two of a plurality of colors with which the first regions are colored, and in which each of the plurality of first regions and each of the plurality of second regions are alternately arranged, an irradiation unit that irradiates a surface of an inspection target with the inspection pattern while sliding the inspection pattern by a movement amount set in advance, a captured image acquisition unit that acquires a captured image obtained by imaging the surface of the inspection target irradiated with the inspection pattern by the irradiation unit, and a determination unit that generates color component images obtained by separating the acquired captured image for each of color components of the plurality of colors and determines whether or not there is a defect in the surface of the inspection target based on the color component images.

BRIEF DESCRIPTION OF THE DRAWINGS

The foregoing and additional features and characteristics of this disclosure will become more apparent from the following detailed description considered with the reference to the accompanying drawings, wherein:

FIG. 9 is a diagram illustrating an inspection pattern creating method; and

DETAILED DESCRIPTION

An inspection device according to the embodiment disclosed here is configured to be able to reduce a time taken for inspection. Hereinafter, an inspection device 1 according to an embodiment will be described.

Figure 1:
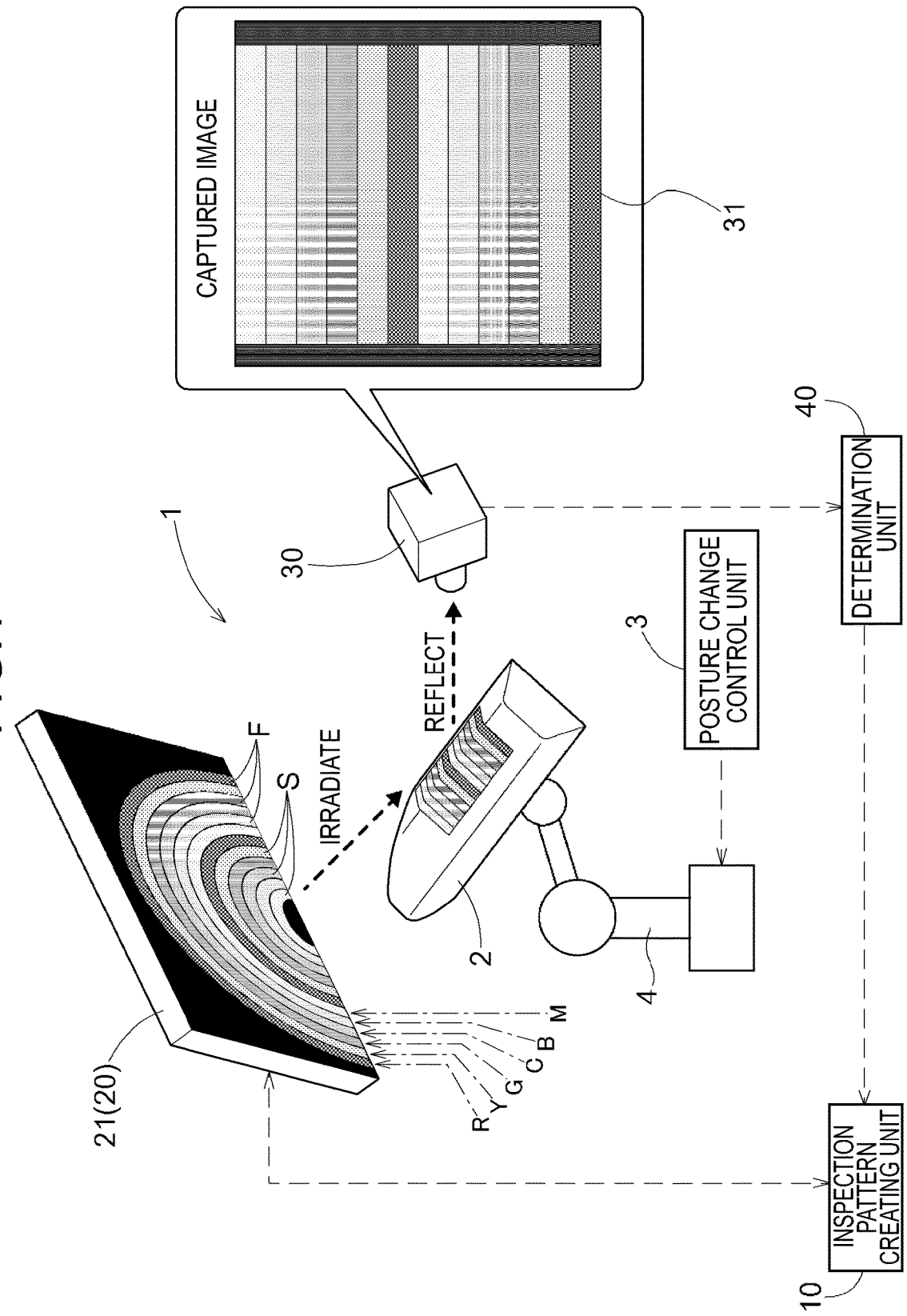
FIG. 1 is a diagram schematically illustrating a configuration of an inspection device.

FIG. 1 is a diagram schematically illustrating a configuration of the inspection device 1 according to the present embodiment. As shown in FIG. 1, the inspection device 1 is configured to include an inspection pattern creating unit 10, an irradiation unit 20, a captured image acquisition unit 30, and a determination unit 40 and each functional unit is organized by means of hardware, software, or both of hardware and software with a CPU as a core member so as to perform a process related to inspection on whether or not there is a defect in a surface of an inspection target 2.

The irradiation unit 20 irradiates the inspection target 2 with light by emitting light from a predetermined position in a display screen 21. The irradiation unit 20 irradiates the inspection target 2 with light when inspection on whether or not there is a defect in the surface of the inspection target 2 is performed and when an inspection pattern for such inspection is created. The irradiation unit 20 is configured to include, for example, a display unit such as a liquid crystal display, an organic EL display, or the like and irradiates the inspection target 2 with light by causing the display screen 21 of the display unit to emit light by means of a predetermined displaying operation.

The captured image acquisition unit 30 acquires a captured image 31 (which will be described later) which is obtained by imaging the inspection target 2 irradiated with light. Here, in a case where the surface of the inspection target 2, which is to be inspected by the inspection device 1, is irradiated with light by the irradiation unit 20, the light is reflected by the surface of the inspection target 2. The captured image acquisition unit 30 acquires the captured image 31 which is obtained by imaging the surface of the inspection target 2 in a state of reflecting light as described above. The captured image acquisition unit 30 can be configured by using an imaging device such as a CMOS image sensor and a CCD image sensor, for example.

Figure 2:
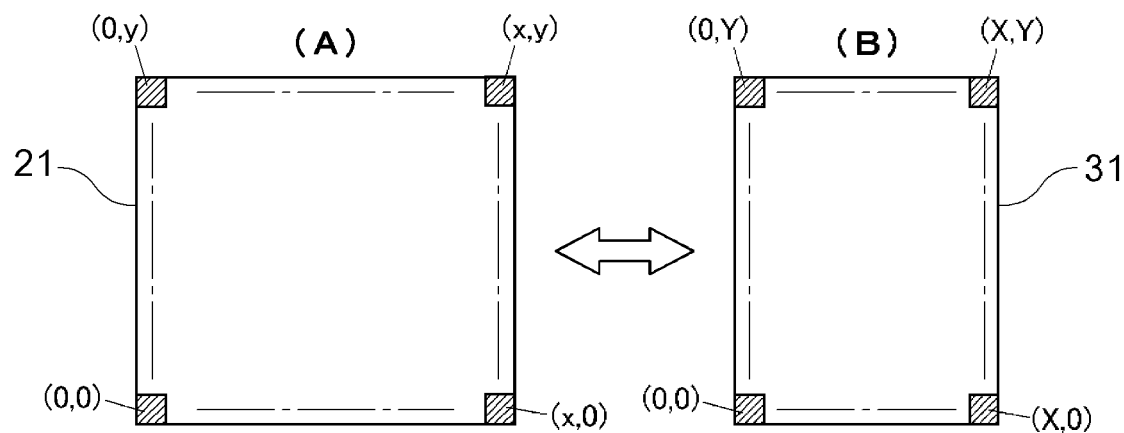
FIG. 2 is a diagram illustrating the concept of calculation of coordinates.

The inspection pattern creating unit 10 creates an inspection pattern to be used for inspection of the surface of the inspection target 2. When creating the inspection pattern, first, the inspection pattern creating unit 10 calculates coordinates in the display screen 21 that correspond to coordinates in the captured image 31 based on light emitting position coordinate information indicating the coordinates of light emitting positions in the display screen 21 and light receiving position coordinate information indicating the coordinates of light receiving positions in the captured image 31. Here, the display screen 21 is divided into regions of a predetermined size as shown in (A) of FIG. 2 and the divided regions are defined by coordinates. The division may be performed in units of pixels of the display screen 21 and may be performed by using one aggregate composed of a plurality of pixels as a unit region.

Here, in a case where the inspection device 1 creates the inspection pattern, the irradiation unit 20 emits light for each of the regions while moving the light emitting position sequentially and the captured image acquisition unit 30 acquires the captured image 31 each time the light emitting position is moved. Information indicating coordinates that define the light emitting positions at this time corresponds to the light emitting position coordinate information. The light emitting position coordinate information is transmitted from the irradiation unit 20 to the inspection pattern creating unit 10.

Meanwhile, information indicating coordinates that define the light receiving positions in the captured image 31 corresponds to the light receiving position coordinate information. Coordinates that define the light receiving positions may be calculated by the captured image acquisition unit 30 or may be calculated by the inspection pattern creating unit 10 using the captured images 31 acquired by the captured image acquisition unit 30. Therefore, the light emitting position coordinate information is transmitted from the irradiation unit 20 to the inspection pattern creating unit 10 in a case where coordinates that define the light receiving positions are calculated by the captured image acquisition unit 30 and the captured images 31 are transmitted from the captured image acquisition unit 30 to the inspection pattern creating unit 10 in a case where coordinates that define the light receiving positions are calculated by the inspection pattern creating unit 10.

Here, as described above, the display screen 21 is divided into the plurality of regions of the predetermined size. In the present embodiment, the captured image 31 is also divided into a plurality of regions of a predetermined size as shown in (B) of FIG. 2, as with the display screen 21. In an example shown in FIG. 2, the display screen 21 is divided by x in a horizontal direction and y in a vertical direction and the captured image 31 is divided by X in the horizontal direction and Y in the vertical direction. Therefore, the above described expression "to calculate coordinates in the display screen 21 that correspond to coordinates in the captured image 31" means to find to which of the plurality of regions in the captured image 31 each of the regions in the display screen 21 corresponds, the captured image 31 being divided into the regions of the predetermined size and the display screen 21 being divided into the regions of the predetermined size. Such calculation can be performed by causing the irradiation unit 20 to emit light for each region in the display screen 21 and specifying the coordinates of a region in the acquired captured image 31, at which the light is received at this time. Note that, X and x may be the same as each other in unit (pixel, mm, or like) and may be different from each other in unit. Note that, Y and y may be the same as each other in unit and may be different from each other in unit.

Referring again to FIG. 1, the inspection pattern creating unit 10 creates, based on the result of the above-described calculation, the inspection pattern that is provided with a plurality of first regions F colored with colors different from each other and a plurality of second regions S each colored with a mixed color obtained by mixing at least two of a plurality of colors, with which the first regions F are colored respectively, and in which the plurality of first regions F and the plurality of second regions S are alternately arranged. The result of the calculation means the result of the calculation of coordinates in the display screen 21 that correspond to coordinates in the captured image 31. The expression "the plurality of first regions F colored with colors different from each other" means a display content in the display screen 21 which is divided into predetermined regions and in which the regions are colored with colors different from each other. In the present embodiment, the first regions F are colored with red, green, and blue, respectively. Accordingly, red, green, and blue correspond to "the plurality of colors with which the first regions F are colored respectively". Note that, in the drawings, for the sake of easy understanding, "R" is given to red, "G" is given to green, and "B" is given to blue.

Meanwhile, the expression "the plurality of second regions S each colored with a mixed color obtained by mixing at least two of the plurality of colors with which the first regions F are colored respectively" means a display content in the display screen 21 which is divided into predetermined regions and in which each of the regions is colored with a mixed color formed by mixing at least two of the plurality of colors that are used when the first regions F are colored. In the present embodiment, for the sake of easy understanding, each of the second regions S is colored with a mixed color that is obtained by mixing two of the plurality of colors with which the first regions F are colored respectively.

Here, as described above, in the present embodiment, the first regions F are colored with red, green, and blue, respectively. Accordingly, in the present embodiment, the plurality of second regions S are colored with yellow which is a mixed color of red and green, cyan which is a mixed color of green and blue, and magenta which is a mixed color of blue and red, respectively. Note that, in the drawings, for the sake of easy understanding, "Y" is given to yellow, "C" is given to cyan, and "M" is given to magenta.

Figure 3:
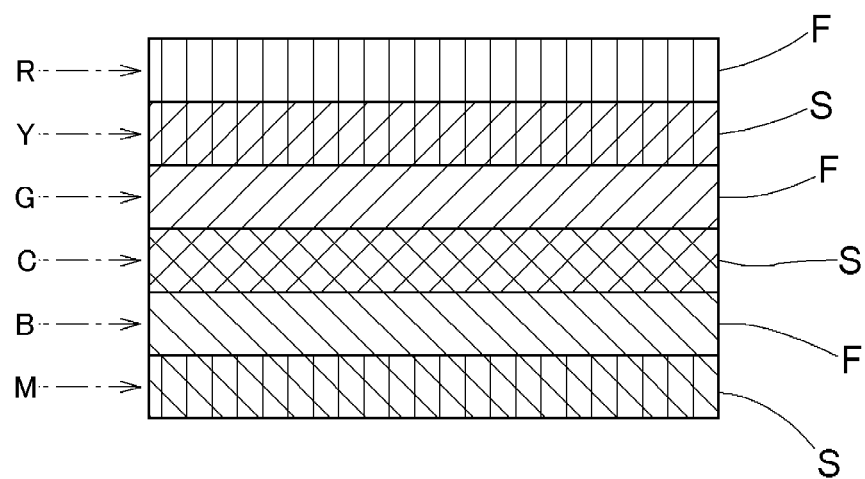
FIG. 3 is a diagram illustrating the concept of creation of an inspection pattern.

The inspection pattern creating unit 10 creates the inspection pattern in which the first regions F respectively colored with red, green, and blue and the second regions S respectively colored with yellow, cyan, and magenta are alternately arranged. An example of such an inspection pattern is shown in FIG. 3. Note that, the inspection pattern may be a pattern including the first regions F and the second regions S that are colored by using each of red, green, blue, yellow, cyan, and magenta one time as shown in FIG. 3 and may be a pattern including the first regions F and the second regions S that are colored by using any of the colors a plurality of times.

Figure 4:
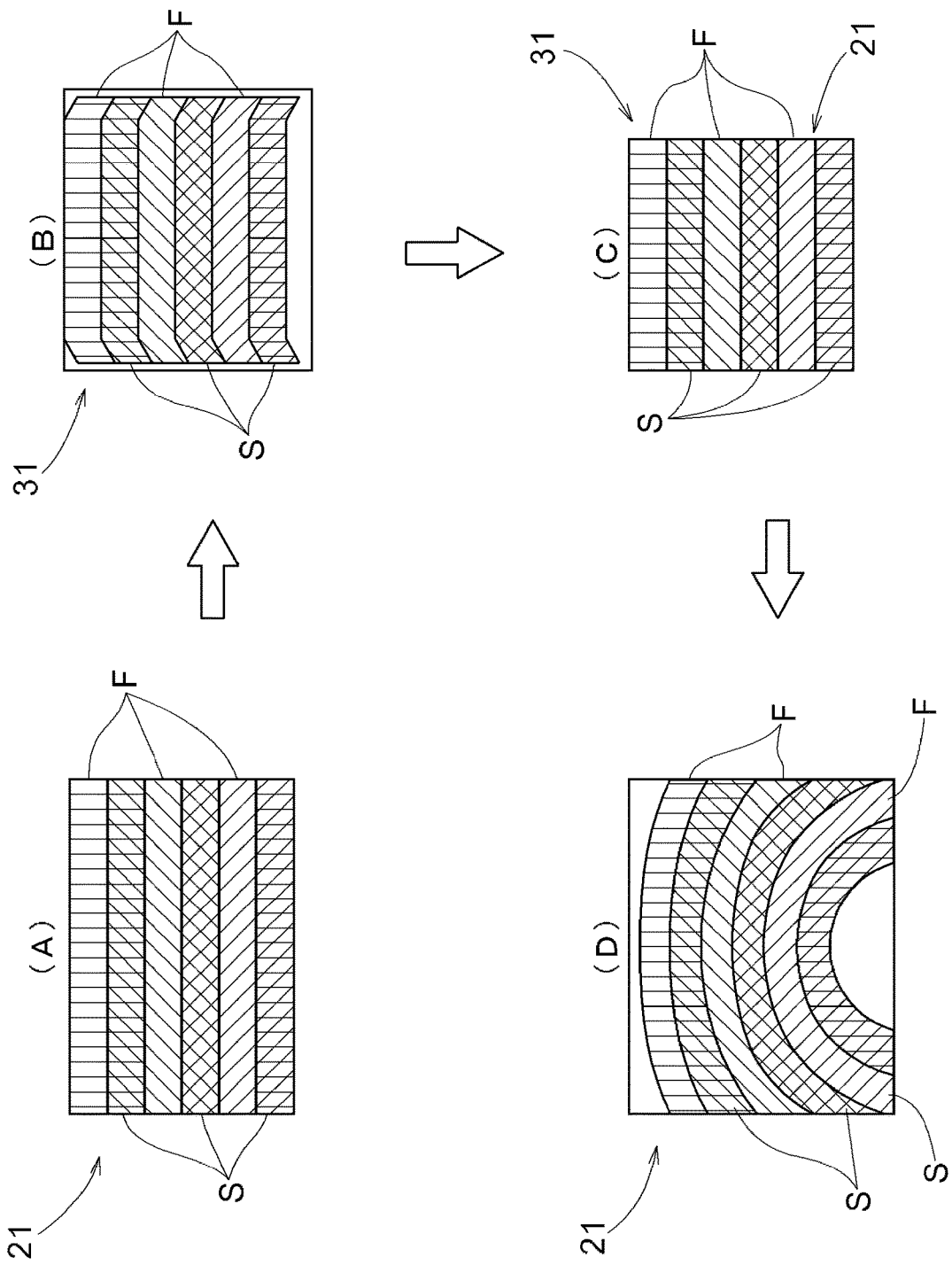
FIG. 4 is a diagram illustrating the concept of creation of the inspection pattern.

Here, as shown in (A) of FIG. 4, even in a case where a pattern in which the first regions F and the second regions S having the same width as each other are arranged in parallel in the display screen 21 as shown in (A) of FIG. 4 is used as the inspection pattern, patterns included in the captured image 31 may not be the same as the inspection pattern depending on the shape of the surface of the inspection target 2. Specifically, for example, in a case where the surface of the inspection target 2 includes a plurality of planar surfaces or in a case where the surface is not a planar surface, the opposite sides of patterns included in the captured image 31 may be curved as shown in (B) of FIG. 4.

In addition, in a case where there is a defect in the surface of the inspection target 2 to be inspected by the inspection device 1, as is well known, patterns included in the captured image 31 become not parallel with each other even in a case where the irradiation unit 20 irradiates the inspection target 2 with the inspection pattern having the first regions F and the second regions S parallel to each other. Therefore, in a case where the opposite sides of patterns included in the captured image 31 are curved as shown in (B) of FIG. 4, an interval between the patterns included in the captured image 31 becomes small and it becomes difficult to distinguish between the patterns. Accordingly, it becomes not possible to easily inspect whether or not there is a defect in the surface of the inspection target 2.

Therefore, in the inspection device 1, the inspection pattern matching the shape of the surface of the inspection target 2 is created. Specifically, the inspection pattern is created such that patterns included in the captured image 31 become parallel to each other as shown in (C) of FIG. 4. Particularly, in the present embodiment, the inspection pattern creating unit 10 creates the inspection pattern such that the width of the first regions F and the second regions S becomes constant in the captured image 31. By creating such an inspection pattern, it is possible to make a distortion in a pattern, which is caused by a defect, noticeable in the captured image 31 in a case where there is a defect in the surface of the inspection target 2. Accordingly, it is possible to appropriately facilitate inspection (determination) on whether or not there is a defect. Note that, in the captured image 31, the inspection pattern formed such that the first regions F and the second regions S are alternately arranged may become arc-shaped as shown in (D) of FIG. 4 corresponding to the shape of the surface of the inspection target 2 and may have an edge (not shown).

Here, it is favorable that the irradiation unit 20 is configured to irradiate regions defined on the inspection target 2 with light in a dot-like shape in a case where the inspection pattern creating unit 10 creates the inspection pattern. In this case, it is possible to accurately perform calculation of coordinates in the display screen 21 that correspond to coordinates in the captured image 31. Therefore, it is possible to appropriately create the inspection pattern along the surface of the inspection target 2 and thus it is possible to accurately perform inspection on whether or not there is a defect.

In addition, for example, the irradiation unit 20 may also be configured to irradiate the inspection target 2 with light in a linear shape. In this case, it is possible to irradiate a wider area with light in comparison with a case where the inspection target is irradiated with light in a dot-like shape and thus it is possible to quickly perform calculation of coordinates in the display screen 21 that correspond to coordinates in the captured image 31. Therefore, it is possible to quickly create the inspection pattern.

Alternatively, the irradiation unit 20 may be configured to irradiate only a portion, for which the inspection pattern creating unit 10 cannot create the inspection pattern as a result of irradiation of the inspection target 2 with light in a linear shape, with light in a dot-like shape. According to such a configuration, it is possible to create the inspection pattern by compensating for a portion, for which the inspection pattern cannot be created with irradiation with light in a linear shape, by means of irradiation with light in a dot-like shape while quickly creating the inspection pattern with irradiation with light in the linear shape.

The inspection device 1 performs inspection on whether or not there is a defect in the surface of the inspection target 2 based on the inspection pattern created as described above. In this case, first, a posture change control unit 3 sets the posture of the inspection target 2 to a posture for the inspection (refer to FIG. 1). Next, the irradiation unit 20 irradiates the surface of the inspection target 2 with the inspection pattern while sliding the inspection pattern by a movement amount set in advance. The inspection pattern is created by the inspection pattern creating unit 10 and is transmitted to the irradiation unit 20. The expression "to slide the inspection pattern by a movement amount set in advance" means to slide the inspection pattern by an amount set in advance along a direction in which the first regions F and the second regions S are stacked. The sliding of the inspection target is performed until the movement amount reaches the amount set in advance (for example, amount corresponding to one cycle). In the present embodiment, the first regions F and the second regions S are the same as each other in length along a direction in which the inspection target is slid.

The captured image acquisition unit 30 acquires the captured image 31 obtained by imaging the surface of the inspection target 2 irradiated with the inspection pattern by the irradiation unit 20. The captured image acquisition unit 30 acquires the captured image 31 obtained by imaging only a regular reflection component reflected by the inspection target 2 which is included in the inspection pattern with which the irradiation unit 20 performs the irradiation. Therefore, the captured image acquisition unit 30 is disposed at a position facing the irradiation unit 20 with the inspection target 2 interposed therebetween. The acquired captured image 31 is transmitted to the determination unit 40 which will be described later. Here, as described above, the irradiation unit 20 irradiates the surface of the inspection target 2 with the inspection pattern while sliding the inspection pattern and the captured image acquisition unit 30 acquires the captured image 31 obtained by imaging the surface of the inspection target 2 each time the inspection pattern is slid.

The determination unit 40 generates color component images obtained by separating the acquired captured image 31 for each of color components of a plurality of colors and determines whether or not there is a defect in the surface of the inspection target 2 based on the color component images. The acquired captured image 31 is a captured image that is acquired by the captured image acquisition unit 30 and is transmitted from the captured image acquisition unit 30. The plurality of colors are colors used when the first regions F are colored and are red, green, and blue in the present embodiment. The expression "to separate the captured image for each of color components" means to separate the captured image for each of components of red, green, and blue. The separating of the captured image for each of color components can be performed by causing the captured image 31 to pass through each of a filter (filter that transmits only red light) that separates components of red (red color components), a filter (filter that transmits only green light) that separates components of green (green color components), and a filter (filter that transmits only blue light) that separates components of blue (blue color components). Such filters are known filters and thus description thereof will be omitted. The determination unit 40 generates a color component image for each of components of red, green, and blue in this manner.

Here, regarding the captured image 31, the color image data format is divided into three components of red, green, and blue for each pixel (in case of RGB format). Therefore, it is also possible to perform the separation by extracting values of red, green, and blue as brightnesses instead of using the filters that separate color components respectively.

Furthermore, it is also possible to perform the separation by changing the color image data format from the RGB format to the HSV format (H: hue, S: saturation, V: lightness), assigning red-yellow-green-cyan-blue-magenta to 0-360, and extracting the lightnesses of hues including red (red, yellow, and magenta), the lightnesses of hues including green (green, yellow, and cyan), and the lightnesses of hues including blue (blue, cyan, and magenta).

Here, in the captured image 31, striped patterns of red, green, and blue and striped patterns of yellow, cyan, and magenta, each of which is a color obtained by mixing two of red, green, and blue, are included. Accordingly, regarding a color component image for each of components of red, green, and blue, the half of regions for striped patterns in the captured image 31 become a striped pattern colored with each color and the remaining half of the regions become a striped pattern of black.

Specifically, in the case of a color component image for red, regions for red, yellow, and magenta in the captured image 31 become a striped pattern of red and the rest of regions become a striped pattern of black. In the case of a color component image for green, regions for green, yellow, and cyan in the captured image 31 become a striped pattern of green and the rest of regions become a striped pattern of black. In the case of a color component image for blue, regions for blue, cyan, and magenta in the captured image 31 become a striped pattern of blue and the rest of regions become a striped pattern of black.

Figure 5:
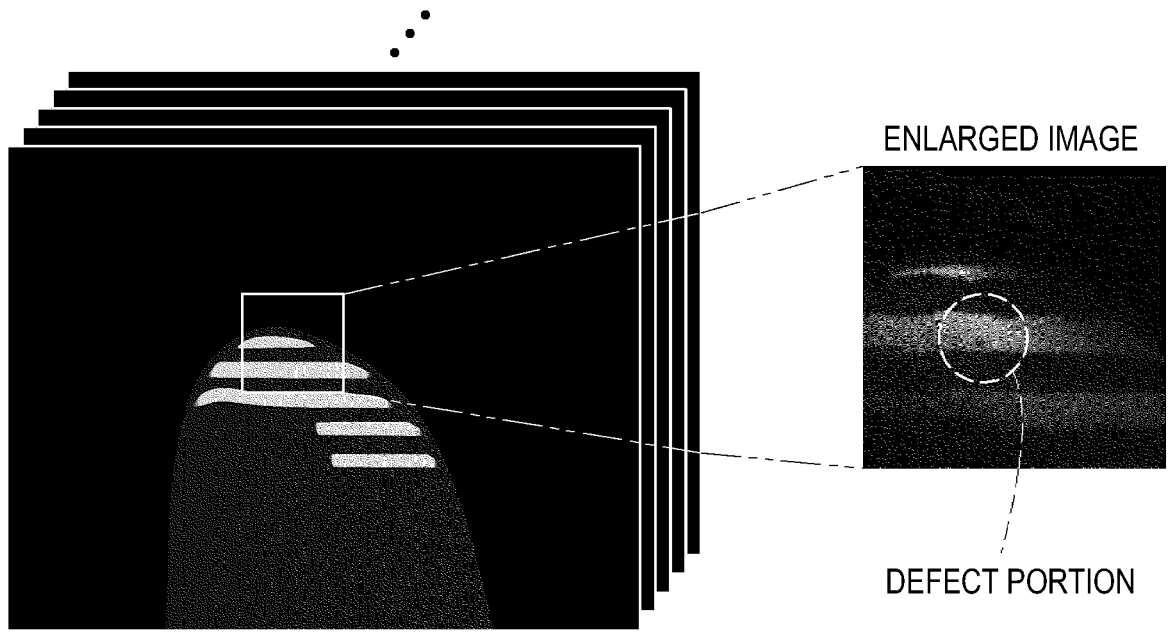
FIG. 5 is a diagram illustrating an example of an image including a striped pattern of white and a striped pattern of black.

For each color component image, the determination unit 40 colors regions, which are colored with a color relating to a corresponding color component, with white. That is, in the case of the color component image for red, regions for a striped pattern of red are colored with white. Therefore, the color component image for red becomes an image including a striped pattern of white and a striped pattern of black. In addition, in the case of the color component image for green, regions for a striped pattern of green are colored with white. Therefore, the color component image for green also becomes an image including a striped pattern of white and a striped pattern of black. Furthermore, in the case of the color component image for blue, regions for a striped pattern of blue are colored with white. Therefore, the color component image for blue also becomes an image including a striped pattern of white and a striped pattern of black. FIG. 5 illustrates an example of an image including a striped pattern of white and a striped pattern of black which is generated in this manner.

Figure 6:
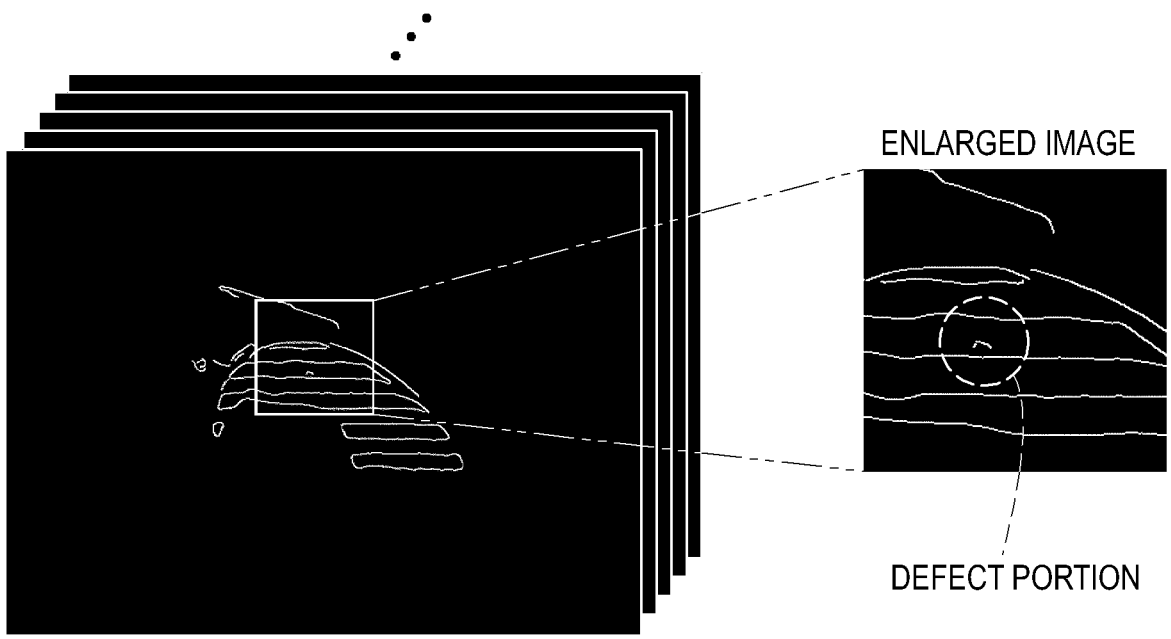
FIG. 6 is a diagram illustrating an example of a stripe edge image.

With respect to an image including a striped pattern of white and a striped pattern of black which is generated in this manner, the determination unit 40 detects boundary portions between white and black and generates a stripe edge image illustrating the boundary portions. FIG. 6 illustrates a stripe edge image generated based on the image including the striped pattern of white and the striped pattern of black, which is shown in FIG. 5. Here, the number of captured images 31 is the same as the number of times that the inspection pattern is slid by the amount set in advance (for example, amount corresponding to one cycle) by the irradiation unit 20. Therefore, the number of stripe edge images is also the same as the number of captured images 31. Such a stripe edge image is generated for each image including a striped pattern of white and a striped pattern of black.

Figure 7:
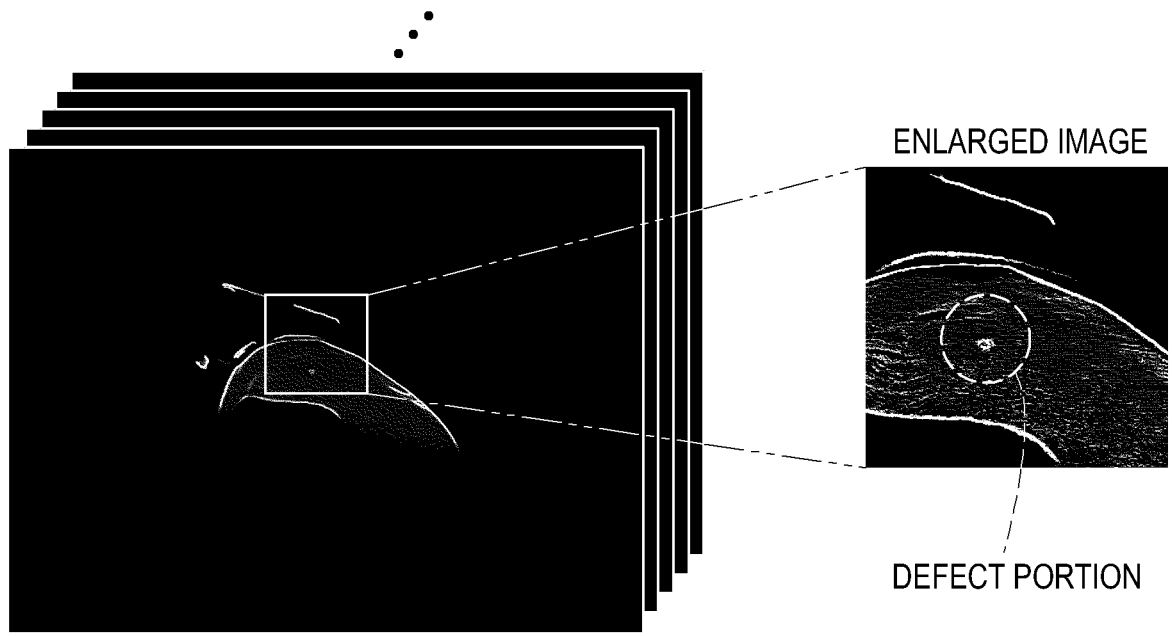
FIG. 7 is a diagram illustrating an example of a stripe density image.

The determination unit 40 generates a stripe density image which is an image obtained by superimposing and combining (integrating) all of the stripe edge images generated. FIG. 7 illustrates a stripe density image. The determination unit 40 determines whether or not the generated stripe density image has a portion whose brightness is equal to or smaller than a first threshold value set in advance and whether or not the generated stripe density image has a portion whose brightness is equal to or greater than a second threshold value set in advance, which is greater than the first threshold value. The determination unit 40 determines that there is a defect in the surface of the inspection target 2 in a case where the stripe density image has a portion whose brightness is equal to or smaller than the first threshold value set in advance and or in a case where the stripe density image has a portion whose brightness is equal to or greater than the second threshold value set in advance.

In a case where the determination unit 40 does not determine that there is a defect and inspection on whether or not there is a defect in another portion of the inspection target 2 is performed, the inspection is continued. Meanwhile, in a case where it is determined that there is a defect, inspection on whether or not there is a defect in the inspection target 2 ends.

Note that, although the inspection target 2 is irradiated with an inspection pattern with the inspection pattern being slid when the inspection device 1 inspects whether or not there is a defect in the inspection target 2 as described above, there may be a variation (bright variation) between the captured images 31, each of which corresponds to one cycle, in brightness although depending on the shape of the inspection target 2. In a case where whether or not there is a defect is inspected based on the captured images 31 with a bright variation, a stripe-shaped low-brightness portion is generated due to the bright variation and thus it becomes difficult to distinguish between the low-brightness portion and a defect portion. Therefore, it is preferable to correct the brightness of the inspection pattern such that a bright variation between the plurality of captured images 31 falls within a range set in advance.

Regarding the correction, the correction can be performed by any of methods (1) to (3) as follow.

(1) A method of increasing the brightness value of a dark portion in the inspection pattern (2) A method of decreasing the brightness value of a bright portion in the inspection pattern (3) A method of increasing the brightness value of a dark portion in the inspection pattern and decreasing the brightness value of a bright portion in the inspection pattern By correcting the brightness in this manner, it is possible to reduce a variation between the plurality of captured images 31 in average brightness. Therefore, the above-described striped-shaped low-brightness portion is removed and thus it is possible to appropriately specify a defect.

Note that, it is preferable that such correction is performed by irradiating the inspection target 2 or a sample having the same shape as the inspection target 2 with the inspection pattern in advance while sliding the inspection pattern to acquire a plurality of the captured images 31 by and correcting the inspection pattern based on the brightnesses of the plurality of captured images 31, before the inspection device 1 inspects whether or not there is a defect in the inspection target 2. By correcting the inspection pattern in this manner, it is possible to create the inspection pattern suitable for the inspection target 2.

Hereinabove, it has been described that the inspection pattern creating unit 10 creates the inspection pattern in which the plurality of first regions F and the plurality of second regions S are alternately arranged. Hereinafter, a specific example of creation of the inspection pattern will be described.

Figure 8:
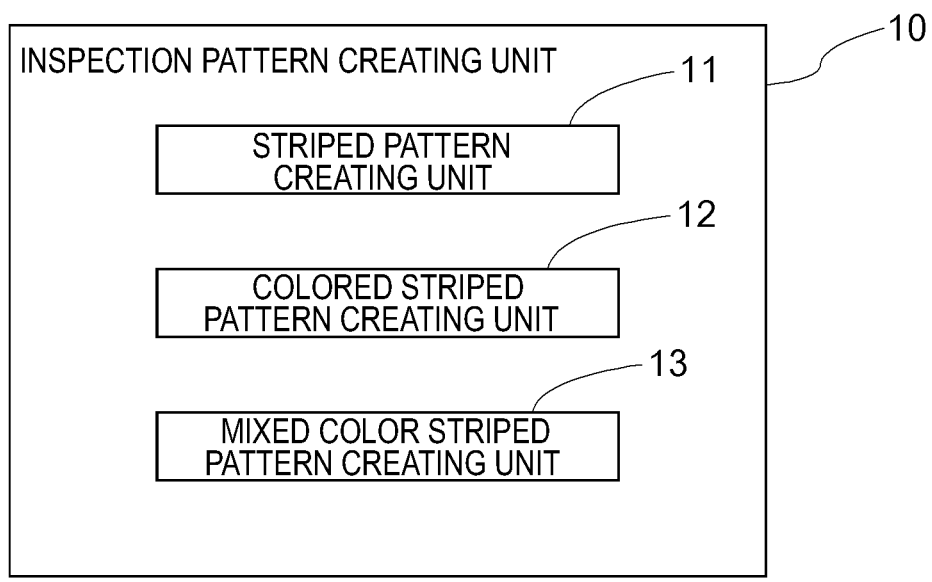
FIG. 8 is a diagram illustrating a configuration of an inspection pattern creating unit.

FIG. 8 is a block diagram illustrating functional units of the inspection pattern creating unit 10. In addition, FIG. 9 is an explanatory diagram relating to creation of the inspection pattern. As shown in FIG. 8, the inspection pattern creating unit 10 can be configured to include a striped pattern creating unit 11, a colored striped pattern creating unit 12, and a mixed color striped pattern creating unit 13.

The striped pattern creating unit 11 creates a plurality of striped patterns in each of which first patterns P1 and second patterns P2 are alternately arranged and which are offset from each other by an amount set in advance along an arrangement direction of the first patterns P1 and the second patterns P2, the number of the plurality of striped patterns corresponding to the number of the plurality of colors. Each first pattern P1 is a pattern colored with a color whose lightness is equal to or greater than a predetermined lightness. Each second pattern P2 is a pattern colored with a color whose lightness is lower than the lightness of the color with which the first pattern P1 is colored. In an example in FIG. 9, for the sake of easy understanding, the first patterns P1 are colored with white and the second patterns P2 are colored with black. Each striped pattern is created such that the first patterns P1 and the second patterns P2 are alternately arranged in this manner. In addition, the number of striped patterns created is equal to the number of the above-described colors with which the first regions F are colored. Since the first regions F are colored with red, green, and blue, three striped patterns are created. The striped patterns are created in a state of being positionally offset from each other by the amount set in advance along the arrangement direction of the first patterns P1 and the second patterns P2, that is, along a direction in which the first patterns P1 and the second patterns P2 are stacked.

The amount set in advance is an amount obtained by multiplying the length of the first pattern P1 along the arrangement direction by a value obtained by dividing a number, which is obtained by subtracting one from the number of the plurality of colors, by the number of the colors. In the present embodiment, the first patterns P1 and the second patterns P2 have the same length along the direction in which the first patterns P1 and the second patterns P2 are stacked. Therefore, the length of the first pattern P1 along the arrangement direction corresponds to an interval between two second patterns P2. Here, the plurality of colors are three colors. Therefore, the value obtained by dividing the number, which is obtained by subtracting 1 from the number of the plurality of colors, by the number of the colors is ⅔. Therefore, the three striped patterns created by the striped pattern creating unit 11 are shifted from each other by ⅔ of the length of the first pattern P1 along the arrangement direction. In (A) of FIG. 9, the three striped patterns are shown. Note that, in (A) of FIG. 9, the amount set in advance is shown as "stripe shifting amount". Hereinafter, for the sake of easy understanding, the three striped patterns will be referred to as a first striped pattern, a second striped pattern, and a third striped pattern.

The colored striped pattern creating unit 12 creates colored striped patterns obtained by coloring the first patterns P1 such that the plurality of striped patterns are colored with colors different from each other. The plurality of striped patterns are the striped patterns created by the striped pattern creating unit 11 and are the first striped pattern, the second striped pattern, and the third striped pattern in the present embodiment. Therefore, the first patterns P1 of the first striped pattern, the first patterns P1 of the second striped pattern, and the first patterns P1 of the third striped pattern are colored with colors different from each other. In the present embodiment, as shown in (B) of FIG. 9, the first patterns P1 of the first striped pattern are colored with red, the first patterns P1 of the second striped pattern are colored with green, and the first patterns P1 of the third striped pattern are colored with blue. The striped patterns colored with respective predetermined colors correspond to the colored striped patterns. Hereinafter, for the sake of easy understanding, the three colored striped patterns will be referred to as a first colored striped pattern, a second colored striped pattern, and a third colored striped pattern.

The mixed color striped pattern creating unit 13 creates, as the inspection pattern, a mixed color striped pattern in which regions in which the first patterns P1 do not overlap each other in a case where the colored striped patterns are superimposed on each other become the first regions F colored with colors with which the first patterns P1 are colored and regions in which the first patterns P1 overlap each other in a case where the colored striped patterns are superimposed on each other become the second regions S colored with colors obtained by mixing the colors with which the first patterns P1 overlapping each other are colored respectively.

The colored striped patterns are the colored striped patterns created by the colored striped pattern creating unit 12 and are the first colored striped pattern, the second colored striped pattern, and the third colored striped pattern in the present embodiment. In a case where the first colored striped pattern, the second colored striped pattern, and the third colored striped pattern are virtually superimposed on each other, there are regions in each of which one first pattern P1 and two second patterns P2 are superimposed on each other and regions in each of which two first patterns P1 and one second pattern P2 are superimposed on each other. In this case, each of the regions in each of which one first pattern P1 and two second patterns P2 are superimposed on each other is colored with a color with which the one first pattern P1 is colored and each of the regions in each of which two first patterns P1 and one second pattern P2 are superimposed on each other is colored with a mixed color obtained by mixing two colors with which the two first patterns P1 are colored respectively.

Specifically, a region in which the first pattern P1 colored with red and two second patterns P2 are superimposed on each other is colored with red, a region in which the first pattern P1 colored with green and two second patterns P2 are superimposed on each other is colored with green, and a region in which the first pattern P1 colored with blue and two second patterns P2 are superimposed on each other is colored with blue. Meanwhile, a region in which the first pattern P1 colored with red, the first pattern P1 colored with green, and one second pattern P2 are superimposed on each other is colored with yellow, which is a mixed color obtained by mixing red and green, a region in which the first pattern P1 colored with green, the first pattern P1 colored with blue, and one second pattern P2 are superimposed on each other is colored with cyan, which is a mixed color obtained by mixing green and blue, and a region in which the first pattern P1 colored with red, the first pattern P1 colored with blue, and one second pattern P2 are superimposed on each other is colored with magenta, which is a mixed color obtained by mixing red and blue. The mixed color striped pattern formed in this manner is shown in (C) of FIG. 9 and the mixed color striped pattern corresponds to the inspection pattern as described above. Note that, in the example in FIG. 9, for the sake of easy understanding, boundaries between the first patterns P1 and the second patterns P2 in each of the striped patterns, the colored striped patterns, and the mixed color striped pattern are represented by straight lines. However, the boundaries can also form curved lines corresponding to the shape of the surface of the inspection target 2 as described above.

In addition, it has been described that the irradiation unit 20 irradiates the inspection target 2 with such an inspection pattern while sliding the inspection pattern. However, the striped patterns, the colored striped patterns, and the mixed color striped pattern may be moved corresponding to a movement amount set in advance such that the inspection pattern is slid and the inspection pattern may be created after the movement.

Figure 10:
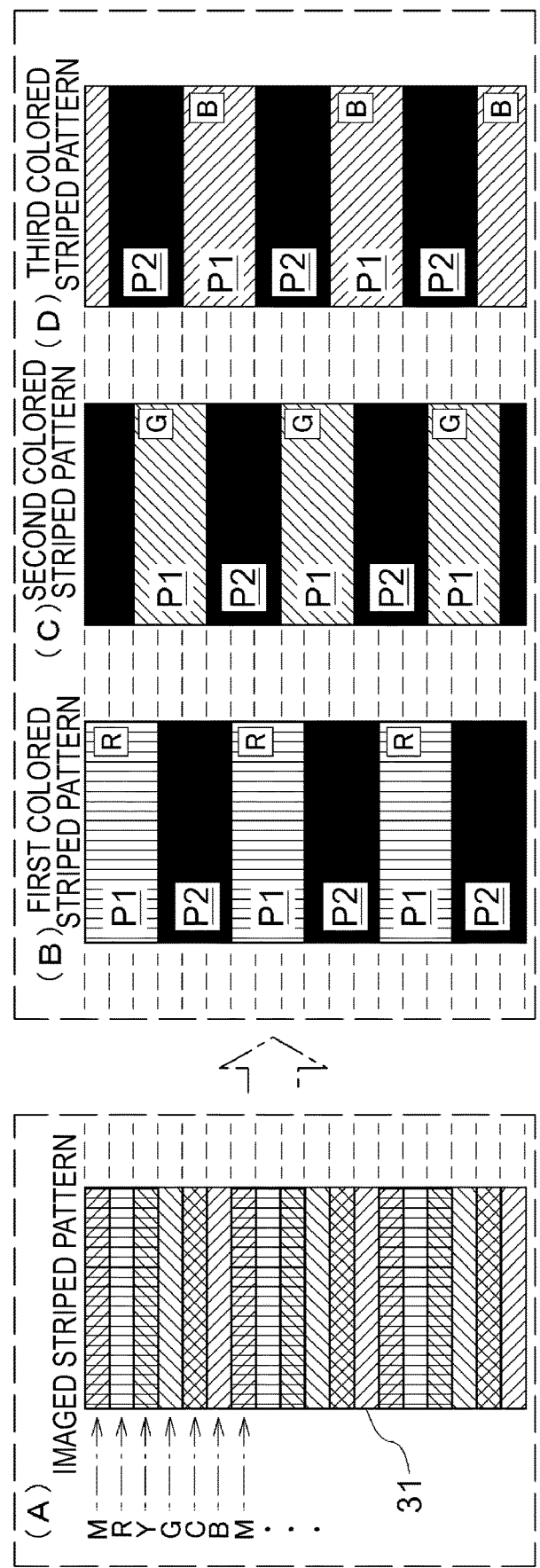
FIG. 10 is a diagram illustrating generation of color component images.

Next, generation of the color component images that is performed by the determination unit 40 will be described using a specific example. FIG. 10 is an explanatory diagram relating to generation of color component images that is performed by the determination unit 40. In (A) of FIG. 10, the captured image 31 acquired by the captured image acquisition unit 30 is shown. As described above, the captured image 31 includes the plurality of colors used for the inspection pattern. In a case where a color component of red is subject to filtering with respect to the captured image 31, regions of red, yellow, and magenta in the captured image 31 form a striped pattern of red as shown in (B) and the rest of regions form a striped pattern of black. Similarly, in a case where a color component of green is subject to filtering with respect to the captured image 31, regions of green, yellow, and cyan in the captured image 31 form a striped pattern of green as shown in (C) and the rest of regions form a striped pattern of black. Furthermore, in a case where a color component of blue is subject to filtering with respect to the captured image 31, regions of blue, cyan, and magenta in the captured image 31 form a striped pattern of blue as shown in (D) and the rest of regions form a striped pattern of black. In this manner, the color component images are generated respectively.

Since the first patterns P1 of the striped patterns are colored with red, green, and blue, the inspection target 2 is irradiated with the inspection pattern created by mixing colors by using each of the colors, and the captured image 31 is divided for each of color components of red, green and blue as described above, it is possible to acquire three striped patterns at the same time by performing irradiation with the inspection pattern and an imaging operation one time. Accordingly, it is possible to reduce a time taken to perform irradiation with an inspection pattern and an imaging operation to ⅓ thereof.

Other Embodiments

In the above-described embodiment, it has been described that each of the second regions S is colored with a color obtained by mixing two of the plurality of colors with which the first regions F are colored respectively. However, each of the second regions S may also be colored with a color obtained by mixing three or more of the plurality of colors with which the first regions F are colored respectively. Specifically, in a case where red, green, and blue are used, the first regions F and the second regions S may be formed such that white, which is obtained by mixing three colors, is used together with yellow, cyan, and magenta, each of which is obtained by mixing two colors.

In the above-described embodiment, it has been described that the first regions F and the second regions S are the same as each other in length along the direction in which the inspection pattern is slid. However, the first regions F and the second regions S may be different from each other in length along the direction in which the inspection pattern is slid.

In the above-described embodiment, it has been described that the first regions F are colored with red, green, and blue and the second regions S are colored with yellow, cyan, and magenta. However, the first regions F may be colored with yellow, cyan, and magenta and the second regions S may be colored with red, green, and blue. It is a matter of course that the first regions F may also be colored with colors other than red, green, blue, yellow, cyan, and magenta. In this case as well, it is favorable that the second regions S are colored with colors obtained by mixing colors with which the first regions F are colored. In addition, the first regions F may also be colored with a color that has the same color component as a color component of a color with which the inspection target 2 is colored.

In the above-described embodiment, it has been described that the inspection pattern creating unit 10 is configured to include the striped pattern creating unit 11, the colored striped pattern creating unit 12, and the mixed color striped pattern creating unit 13. However, the inspection pattern creating unit 10 may also be configured to include a functional unit different from the striped pattern creating unit 11, the colored striped pattern creating unit 12, and the mixed color striped pattern creating unit 13.

In the above-described embodiment, it has been described that the striped pattern creating unit 11 creates the plurality of striped patterns in each of which first patterns P1 and second patterns P2 are alternately arranged and which are offset from each other by the amount, which is obtained by multiplying the length of the first pattern P1 along the arrangement direction by the value obtained by dividing a number, which is obtained by subtracting one from the number of the plurality of colors, by the number of the colors, along the arrangement direction of the first patterns P1 and the second patterns P2, the number of the plurality of striped patterns corresponding to the number of the plurality of colors. However, the embodiment disclosed here can be applied even in a case where the striped patterns are offset from each other by an amount different from the amount, which is obtained by multiplying the length of the first pattern P1 along the arrangement direction by the value obtained by dividing a number, which is obtained by subtracting one from the number of the plurality of colors, by the number of the colors, along the arrangement direction of the first patterns P1 and the second patterns P2. In this case as well, it is possible to reduce a time taken for inspection on whether or not there is a defect in the surface of the inspection target 2 by generating the color component images and performing determination by using the stripe density image corresponding to the generated color component images.

In addition, in the above-described embodiment, it has been described that the plurality of first regions F and the plurality of second regions S are alternately arranged. However, the first regions F and the second regions S may be arranged randomly without being alternately arranged. In this case as well, it is possible to reduce a time taken for inspection on whether or not there is a defect in the surface of the inspection target 2 by generating the color component images and performing determination by using the stripe density image corresponding to the generated color component images.

In the above-described embodiment, it has been described that the striped pattern creating unit 11 creates the plurality of striped patterns in each of which the first patterns P1 and the second patterns P2 are alternately arranged, the number of the plurality of striped patterns corresponding to the number of the plurality of colors. However, the number of the striped patterns may be different from the number of the plurality of colors. In this case, it is favorable that the mixed color striped pattern creating unit 13 is configured such that the areas of the first patterns P1 colored with colors not being mixed are enlarged in one mixed color striped pattern. That is, the first regions F may be wider than the second regions S in one mixed color striped pattern. In this case as well, it is possible to reduce a time taken for inspection on whether or not there is a defect in the surface of the inspection target 2 by generating the color component images and performing determination by using the stripe density image corresponding to the generated color component images.

In the above-described embodiment, it has been described that the first regions F are colored with three colors (red, green, and blue). However, the first regions F may also be colored with two colors. In this case as well, it is possible to reduce a time taken for inspection on whether or not there is a defect in the surface of the inspection target 2 as with a case where three colors are used by using an inspection pattern in which each of the second regions S is colored with a mixed color obtained by mixing two colors. Furthermore, it is possible to reduce a time taken for inspection on whether or not there is a defect in the surface of the inspection target 2 even in a case where two colors are used, in a case where the striped patterns are offset from each other by an amount different from the amount, which is obtained by multiplying the length of the first pattern P1 along the direction in which the first patterns P1 are arranged by the value obtained by dividing a number, which is obtained by subtracting 1 from the number of the plurality of colors, by the number of the colors, along the direction in which the first patterns P1 and the second patterns P2 are arranged, and in a case where the plurality of first regions F and the plurality of second regions S are randomly arranged.

The embodiment disclosed here can be used for an inspection device that inspects whether or not there is a defect in a surface of an inspection target.

A feature of an inspection device according to an aspect of this disclosure resides in that the inspection device includes an inspection pattern creating unit that creates an inspection pattern which is provided with a plurality of first regions each colored with a color different from each other and a plurality of second regions each colored with a mixed color obtained by mixing at least two of a plurality of colors with which the first regions are colored, and in which each of the plurality of first regions and each of the plurality of second regions are alternately arranged, an irradiation unit that irradiates a surface of an inspection target with the inspection pattern while sliding the inspection pattern by a movement amount set in advance, a captured image acquisition unit that acquires a captured image obtained by imaging the surface of the inspection target irradiated with the inspection pattern by the irradiation unit, and a determination unit that generates color component images obtained by separating the acquired captured image for each of color components of the plurality of colors and determines whether or not there is a defect in the surface of the inspection target based on the color component images.

According to the configuration, since the inspection pattern in which the plurality of first regions each colored with a colors different from each other and the plurality of second regions each colored with a mixed color obtained by mixing the plurality of colors are alternately arranged is used, it is possible to make the inspection pattern include a plurality of information items and to make one captured image include information corresponding to a plurality of colors. Therefore, it is possible to reduce a time taken to acquire the same amount of information and thus it is possible to reduce a time taken to perform irradiation with the inspection pattern and an imaging operation. Specifically, in a case where irradiation with an inspection pattern and an imaging operation are performed thirty times for performing inspection one time in the related art, it is possible to reduce the number of times that inspection with the inspection pattern and the imaging operation are performed to $\frac{1}{3}$ thereof when three colors are used as colors with which the first regions are colored in the inspection device. According to the inspection device, it is possible to reduce an inspection time.

It is preferable that the first regions and the second regions are the same as each other in length along a direction in which the inspection pattern is slid.

According to the configuration, since the first regions and the second regions appear periodically while the inspection pattern is being slid, it is possible to make the movement amount at the time of the slide of the inspection pattern constant. Therefore, it is possible to simplify a process of the slide.

It is preferable that the plurality of colors are red, green, and blue and the mixed colors are yellow, cyan, and magenta.

According to the configuration, since red, green, and blue are different from each other in main color component, it becomes easy to acquire a color component image based on each color component. Therefore, it is possible to increase the accuracy of detection on whether or not there is a defect in the surface of the inspection target.

It is preferable that the inspection pattern creating unit includes a striped pattern creating unit that creates a plurality of striped patterns in each of which first patterns and second patterns are alternately arranged and which are offset from each other by an amount set in advance along an arrangement direction of the first patterns and the second patterns, the number of the plurality of striped patterns corresponding to the number of the plurality of colors, a colored striped pattern creating unit that creates colored striped patterns obtained by coloring the first patterns for each of the plurality of striped patterns such that each of the first patterns is colored with the color different from each other, and a mixed color striped pattern creating unit that creates, as the inspection pattern, a mixed color striped pattern in which, in a case where the colored striped patterns are superimposed on each other, regions in which the first patterns do not overlap each other serves as the first regions colored with a color with which the first patterns are colored and regions in which the first patterns overlap each other serves as the second regions colored with a color obtained by mixing the colors with which the first patterns overlapping each other are colored, and the amount set in advance is an amount obtained by multiplying a length of the first pattern along the arrangement direction by a value obtained by dividing a number, which is obtained by subtracting one from the number of the plurality of colors, by the number of the colors.

According to the configuration, it is possible to easily create the inspection pattern and thus it is possible to suppress an increase in calculation load relating to creation of the inspection pattern.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An inspection device comprising:
an inspection pattern creating unit that creates an inspection pattern which is provided with a plurality of first regions each colored with a color different from each other and a plurality of second regions each colored with a mixed color obtained by mixing at least two of a plurality of colors with which the first regions are colored, and in which each of the plurality of first regions and each of the plurality of second regions are alternately arranged;
an irradiation unit that irradiates a surface of an inspection target with the inspection pattern while sliding the inspection pattern by a movement amount set in advance;
a captured image acquisition unit that acquires a captured image obtained by imaging the surface of the inspection target irradiated with the inspection pattern by the irradiation unit; and
a determination unit that generates color component images obtained by separating the acquired captured image for each of color components of the plurality of colors and determines whether or not there is a defect in the surface of the inspection target based on the color component images.

2. The inspection device according to claim 1, wherein the first regions and the second regions are the same as each other in length along a direction in which the inspection pattern is slid.

3. The inspection device according to claim 1, wherein the plurality of colors are red, green, and blue and the mixed colors are yellow, cyan, and magenta.

4. The inspection device according to claim 1, wherein the inspection pattern creating unit includes
a striped pattern creating unit that creates a plurality of striped patterns in each of which first patterns and second patterns are alternately arranged and which are offset from each other by an amount set in advance along an arrangement direction of the first patterns and the second patterns, the number of the plurality of striped patterns corresponding to the number of the plurality of colors,
a colored striped pattern creating unit that creates colored striped patterns obtained by coloring the first patterns for each of the plurality of striped patterns such that each of the first patterns is colored with the color different from each other, and a mixed color striped pattern creating unit that creates, as the inspection pattern,
a mixed color striped pattern in which, in a case where the colored striped patterns are superimposed on each other, regions in which the first patterns do not overlap each other serves as the first regions colored with a color with which the first patterns are colored and regions in which the first patterns overlap each other serves as the second regions colored with a color obtained by mixing the colors with which the first patterns overlapping each other are colored, and
the amount set in advance is an amount obtained by multiplying a length of the first pattern along the arrangement direction by a value obtained by dividing a number, which is obtained by subtracting one from the number of the plurality of colors, by the number of the colors.

* * * * *